United States Patent
Ooe et al.

(10) Patent No.: US 8,835,069 B2
(45) Date of Patent: Sep. 16, 2014

(54) FUEL CELL SYSTEM HAVING CONTROLLABLE WATER FEED FLOW RATE

(75) Inventors: Toshiharu Ooe, Fukuoka (JP); Kiyotaka Nakano, Fukuoka (JP); Yoshiyuki Kawamura, Fukuoka (JP); Katsuhisa Tsuchiya, Fukuoka (JP); Tsukasa Shigezumi, Fukuoka (JP)

(73) Assignee: Toto Ltd., Fukuoka (JP)

( * ) Notice: Subject to any disclaimer, the term of this patent is extended or adjusted under 35 U.S.C. 154(b) by 707 days.

(21) Appl. No.: 12/751,500

(22) Filed: Mar. 31, 2010

(65) Prior Publication Data

US 2010/0248048 A1   Sep. 30, 2010

(30) Foreign Application Priority Data

Mar. 31, 2009   (JP) ................ 2009-086596

(51) Int. Cl.
*H01M 8/04*   (2006.01)
(52) U.S. Cl.
USPC ........... 429/450; 429/413; 429/429; 429/495; 429/423
(58) Field of Classification Search
USPC ......... 429/450, 429, 443, 423, 416, 413, 427, 429/420, 452, 495, 512
See application file for complete search history.

(56) References Cited

FOREIGN PATENT DOCUMENTS

| GB | 2 439 653 A | 1/2008 | | |
|---|---|---|---|---|
| JP | 2008-053209 A | 3/2008 | | |
| JP | 2008-159463 | * 7/2008 | ............. | H01M 8/04 |
| JP | 2008-159463 A | 7/2008 | | |
| JP | 2008-243596 A | 10/2008 | | |
| JP | 2008-243597 A | 10/2008 | | |

OTHER PUBLICATIONS

The Extended European Search Report dated Mar. 28, 2011; European Patent Application No. / Patent No. 10250683.9-1227 / 2237352.

* cited by examiner

*Primary Examiner* — Raymond Alejandro
(74) *Attorney, Agent, or Firm* — Studebaker & Brackett PC

(57) ABSTRACT

A fuel cell system includes a fuel cell module having a solid-oxide fuel cell and a reformer adapted to perform steam reforming of a fuel gas supplied to the solid-oxide fuel cell, a water supplying unit and a control unit. The controller unit is adapted to control, at least during start up of the fuel cell system switching of a pulse pump from a stop state to a pumping state to start pumping of water, and to change the pulse pump to a normal control state after performing a start-operation-control which sets a feed flow rate of the pulse pump higher for a predetermined time than a feed flow rate of the water during the normal control state.

8 Claims, 6 Drawing Sheets

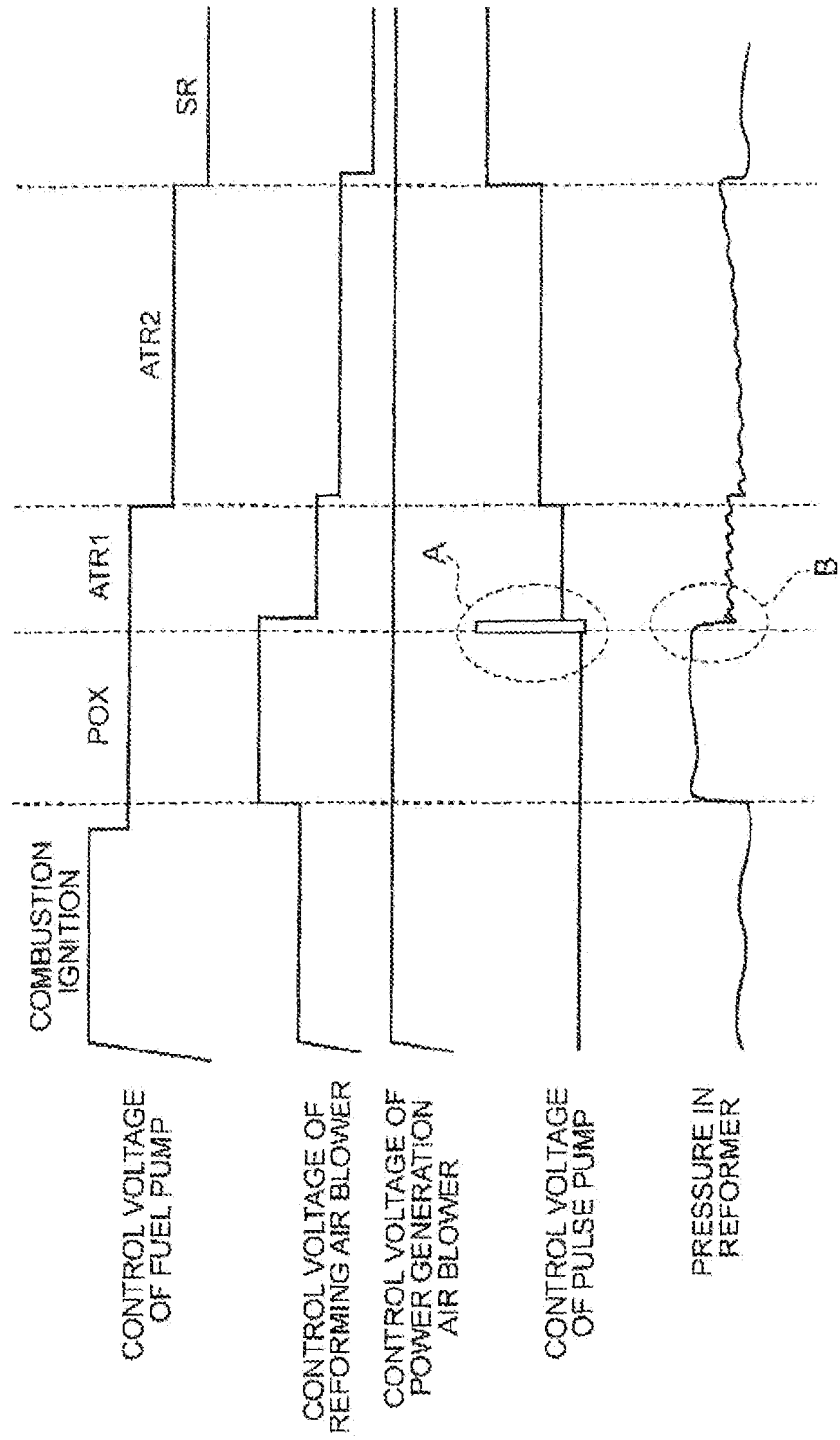

FUEL CELL SYSTEM HAVING CONTROLLABLE WATER FEED FLOW RATE

CROSS-REFERENCE TO RELATED APPLICATION

This application claims benefit under 35 U.S.C. sctn. 119(a) of Japanese Patent Application No. 2009-086596, filed on Mar. 31, 2009, in the Japan Patent Office, the entire contents of which are incorporated herein by reference.

BACKGROUND OF THE INVENTION

1. Field of the Invention

The present invention relates to a fuel cell system including a solid-oxide fuel cell (SOFC).

2. Description of the Related Art

Conventionally, as such a fuel cell system, a fuel cell system explained below is known. A solid-oxide fuel cell is formed in a bottomless or bottomed cylindrical shape, a fuel gas containing hydrogen is let through the inner side or the outer side of the fuel cell and an oxidant gas (the air) is let through the other side to cause a power generation reaction. The fuel gas is obtained by reforming a fuel gas containing hydrocarbon such as a utility gas. The reforming is performed by a reformer. The reforming is so-called steam reforming. As a fuel cell system that performs the steam reforming in the reformer, for example, Japanese Patent Application Laid-Open No. 2008-53209 discloses an example of the fuel cell system.

Japanese Patent Application Laid-Open No. 2008-53209 discloses a technique explained below. A pump is provided upstream of the reformer to supply water (steam) to the reformer. The reformer causes steam reforming (hereinafter also referred to as SR) using the water (the steam) and a fuel gas containing hydrocarbon to obtain a reformed fuel gas.

An SOFC has high power generation efficiency and use only a small amount of a fuel gas. Therefore, there is an advantage that only extremely small amounts of gas and steam have to be supplied to a reformer. For example, in the SR explained above, a required amount of water is about 8 ml per minute.

Attention is paid to a starting method peculiar to a fuel cell system including the SOFC. Since the SR is an endothermic reaction, if the SR is immediately performed in the beginning of start, the temperature of a module including the SOFC does not rise and does not rise to stable operation temperature. Therefore, in the beginning of start, only the air and gas are fed into the reformer to cause the reformer to perform partial oxidation reforming (hereinafter also referred to as POX) as a heat generating reaction.

When the POX and the SR are compared, since hydrogen generation efficiency is high in the SR, it is demanded to gradually shift to the SR according to a temperature rise in the SOFC. Therefore, when attention is paid to an amount of water supplied to the reformer, it is necessary to smoothly shift from a state in which no water is used to water supply of about 8 ml per minute. During such shift, in some case, auto thermal reforming (hereinafter also referred to as ATR) including both the POX and the SR is advanced.

In view of the circumstances explained above, it is desirable to gradually increase an amount of water supplied to the reformer from as small an amount as possible. However, actually, it is extremely difficult to perform such water supply. The fuel cell system including the SOFC has high efficiency as explained above and reaches extremely high temperature (about 700° C.). Therefore, when the fuel cell system is restarted after once started and stopped, the temperature of a water supply pipe for supplying water to the reformer rises. It is highly likely that water in the water supply pipe has evaporated. It is extremely difficult to accurately supply a small amount of water to the water supply pipe in which there is no water.

In order to accurately supply a small amount of water, a high sensitivity sensor for detecting such a small amount of water is necessary. However, if the high sensitivity sensor is used to detect a small amount of water, a flow of the air before a flow of the water is also detected. Therefore, accurate detection of an amount of water cannot be performed. Further, it is extremely difficult to adopt the high sensitivity sensor in terms of cost and the like.

On the other hand, if a general and practical low sensitivity sensor is used, such a flow of the air is not detected. However, when a small amount of water near a lower measurement limit flows into the water supply pipe, it is extremely difficult to surely detect the water. This is because a detecting mechanism (e.g., a gear or an impeller) of the sensor stands still in a state in which there is no flow of water or there is no water. Since a coefficient of static friction works well in the detecting mechanism in the standstill state, even if a very small amount of water flows, it is highly likely that the detecting mechanism does not operate because the flow does not overcome friction such as abrasion. Therefore, in particular, in an initial period of driving from a cold stop state, detection is difficult.

As a result of such an examination, the inventors found that, even with a sensor that can steadily detect a flow of a predetermined amount of water, it is difficult to surely detect the flow of the predetermined amount of water in an initial operation state. If such inability to surely detect an amount of water supplied to the reformer is left unattended, it is likely that insufficiency of water or excessive supply of water occurs. When water is insufficient, in some case, carbon deposition occurs in the reformer and a fuel cell and a catalyst are broken. When water is excessive, in some case, the temperature of a module including the fuel cell does not rise and stable operation cannot be performed.

SUMMARY OF THE INVENTION

The present invention has been devised in view of such problems and it is an object of the present invention to provide a fuel cell system including an SOFC that can accurately supply a small amount of water at a stage of shift to steam reforming and smoothly shift from partial oxidation reforming to steam reforming.

In order to solve the problems, a fuel cell system according to the present invention is a fuel cell system including a fuel cell module having a solid-oxide fuel cell. The fuel cell module has a fuel cell and a reformer that performs steam reforming for a fuel gas supplied to the fuel cell. The fuel cell system includes water supplying means for supplying water to the reformer and control means for controlling the water supplying means. The water supplying means has a water storage tank that stores water to be supplied to the reformer, a pump that pumps the water stored in the water storage tank to the reformer, and flow rate detecting means for detecting a supply amount of the water to the reformer by the pump. At least during start, in switching the pump from a stop state to a pumping state to start pumping of the water, the control means shifts to normal control after performing start-operation-control for setting a water supply ability of the pump higher for a predetermined time than the water supply ability during normal control.

The fuel cell system according to the present invention performs, in switching the pump, which pumps the water from the water storage tank to the reformer, from the stop state to the pumping state to start pumping of the water, the start-operation-control for setting a water supply ability of the pump higher for a predetermined time than the water supply ability during normal control. With this start-operation-control, even if the flow rate detecting means is in a standstill state, the fuel cell system increases the water supply ability of the pump to surely actuate the flow rate detecting means and surely release the standstill state and enable sensing by the flow rate detecting means. Even in a state in which water in a conduit leading from the water storage tank to the reformer has evaporated and no water is present in the conduit, it is possible to surely actuate the flow rate detecting means by setting the predetermined time such that the water surely reaches from the pump to the flow rate detecting means. In the case of a state in which no water is present in the conduit leading from the water storage tank to the reformer, a portion of the conduit in the waterless state functions as a buffering zone. Therefore, even if the water supply ability of the pump is increased for the predetermined time, excessive water is not supplied to the reformer.

Therefore, in the present invention, even when water in the conduit leading from the pump to the reformer has evaporated, the water supply ability of the pump is temporarily increased by using the waterless state of the conduit. It is possible to prevent excessive supply of water to the reformer or insufficiency of supply of water and accurately and surely supply a small amount of water to the reformer. As a result, it is possible to prevent a situation in which the flow rate detecting means cannot detect the supply of water from the pump to the reformer, accurately and surely supply water necessary for a reforming reaction that uses steam such as the SR or the ATR, and prevent occurrence of deficiencies of the reformer and the cell.

In the fuel cell system according to the present invention, it is also preferable that the control means starts, during start, the reforming reaction in the reformer from the POX and transition the reforming reaction from the ATR to the SR and executes the start-operation-control during the start of the ATR.

In starting from the POX and transitioning to the SR through the ATR, an amount of water required in the POX is 0 and an amount of water required in the SR is about 8 ml per minute. In the ATR between the POX and the SR, it is necessary control an amount of water between 0 ml to 8 ml per minute. In this preferred embodiment of the present invention, the start-operation-control is executed during the start of the ATR. Therefore, it is possible to accurately and surely supply a small amount of water equal to or smaller than 8 ml per minute and prevent occurrence of deficiencies of the reformer and the cell.

In the fuel cell system according to the present invention, it is also preferable that the ATR includes first auto thermal reforming (hereinafter also referred to as first ATR) in which an amount of water supplied to the reformer is a first amount and second auto thermal reforming (hereinafter also referred to as second ATR) that is a reaction performed following the first ATR when the temperature of the reformer rises to be equal to or higher than predetermined temperature and in which an amount of water supplied to the reformer is a second amount larger than the first amount, and the control means executes the start-operation-control during the start of the first ATR.

In this preferred embodiment, the ATR is divided into the first ATR and the second ATR. The temperature of the reformer in the first ATR is set lower than the temperature of the reformer in the second ATR. Therefore, a catalyst activity is low in the first ATR. When the first ATR is executed in a low temperature region in which the catalyst activity is low in this way, the first amount of water smaller than the second amount of water supplied to the reformer in the second ATR is required. In particular, during the start of the first ATR, it is desirable to supply an extremely small amount of water, for example, 1 ml per minute to the reformer. Water of the extremely small amount of about 1 ml per minute is supplied to the reformer by using the start-operation-control in the present invention. It is possible to prevent occurrence of deficiencies of the reformer and the cell and realize smooth shift of the reforming reaction by stably supplying an extremely small amount of water to the reformer in the first ATR following the POX in this way. In other words, the present invention that can accurately supply a small amount of water of about 1 ml per minute is found, whereby steps of the first ATR and the second ATR are provided during the shift to ATR in which heat-up of the reformer is insufficient. The first ATR in which an amount of water is always small is provided and water can be accurately supplied in the first ATR. Therefore, it is possible to perform stable heat-up during start and also realize a reduction in start time while preventing the influence on the cell.

In the fuel cell system according to the present invention, it is preferable that, during execution of the start-operation-control, the control means shifts to the normal control after determining, on the basis of a detection result of the flow rate detecting means, that water is pumped from the pump to the reformer.

In the present invention, the water supply ability of the pump is set higher than that in the normal control in the start-operation-control and water is fed to the reformer with strong pumping force. Therefore, even in a state in which the flow rate detecting means is locked and hard to operate because, for example, a coefficient of static friction is larger in a cold initial period, the flow rate detecting means is forcibly actuated by strong force of the air and the water due to the strong pumping of the pump. It is possible to surely release the lock of the flow rate detecting means and set the flow rate detecting means in an operation state. Therefore, after an operation signal of the flow rate detecting means is transmitted, it is possible to correctly check flow rate detection for water supplied to the conduit. In the normal control after that, it is possible to correctly perform control trusting a signal of the flow rate detecting means even if an amount of water is extremely small.

In the fuel cell system according to the present invention, it is also preferable that the control means suppresses the water supply ability of the pump after determining the pumping of water from the pump to the reformer, reduces an amount of the air supplied to the reformer, and shifts to the normal control.

In this preferred embodiment, after the pumping of water from the pump to the reformer is determined, the water supply ability of the pump is reduced to set an amount of water supplied to the reformer to a target extremely small amount and reduce an amount of the air supplied to the reformer. Therefore, it is possible to accurately synchronize timing for reducing an amount of the air in the reformer and timing for supplying an extremely small amount of water and it is possible to surely prevent occurrence of carbon deposition.

In the fuel cell system according to the present invention, it is also preferable that the start-operation-control is control for maximizing the water supply ability of the pump.

In this preferred embodiment, the water supply ability of the pump is maximized in the start-operation-control. Therefore, it is possible to surely drive the flow rate detecting means and more accurately and surely feed a small amount of water to the reformer.

In the fuel cell system according to the present invention, it is also preferable that the pump is arranged above the water storage tank and near the side of the fuel cell module including the fuel cell.

In this preferred embodiment, the pump is arranged above the water storage tank and near the fuel cell module side. Therefore, it is possible to reduce the length of the conduit from the pump to the reformer. It is possible to more accurately synchronize the timing for reducing an amount of the air in the reformer and the timing for supplying an extremely small amount of water. The pump is interposed between the water storage tank and the reformer and is arranged above the water storage tank. Therefore, it is possible to stop, with the pump, evaporation of water in the conduit between the water storage tank and the reformer.

BRIEF DESCRIPTION OF THE DRAWINGS

FIG. 6 is a timing chart in supplying water to the fuel cell module in the fuel cell system shown in FIG. 1.

DETAILED DESCRIPTION OF THE PREFERRED EMBODIMENTS

Figure 1:
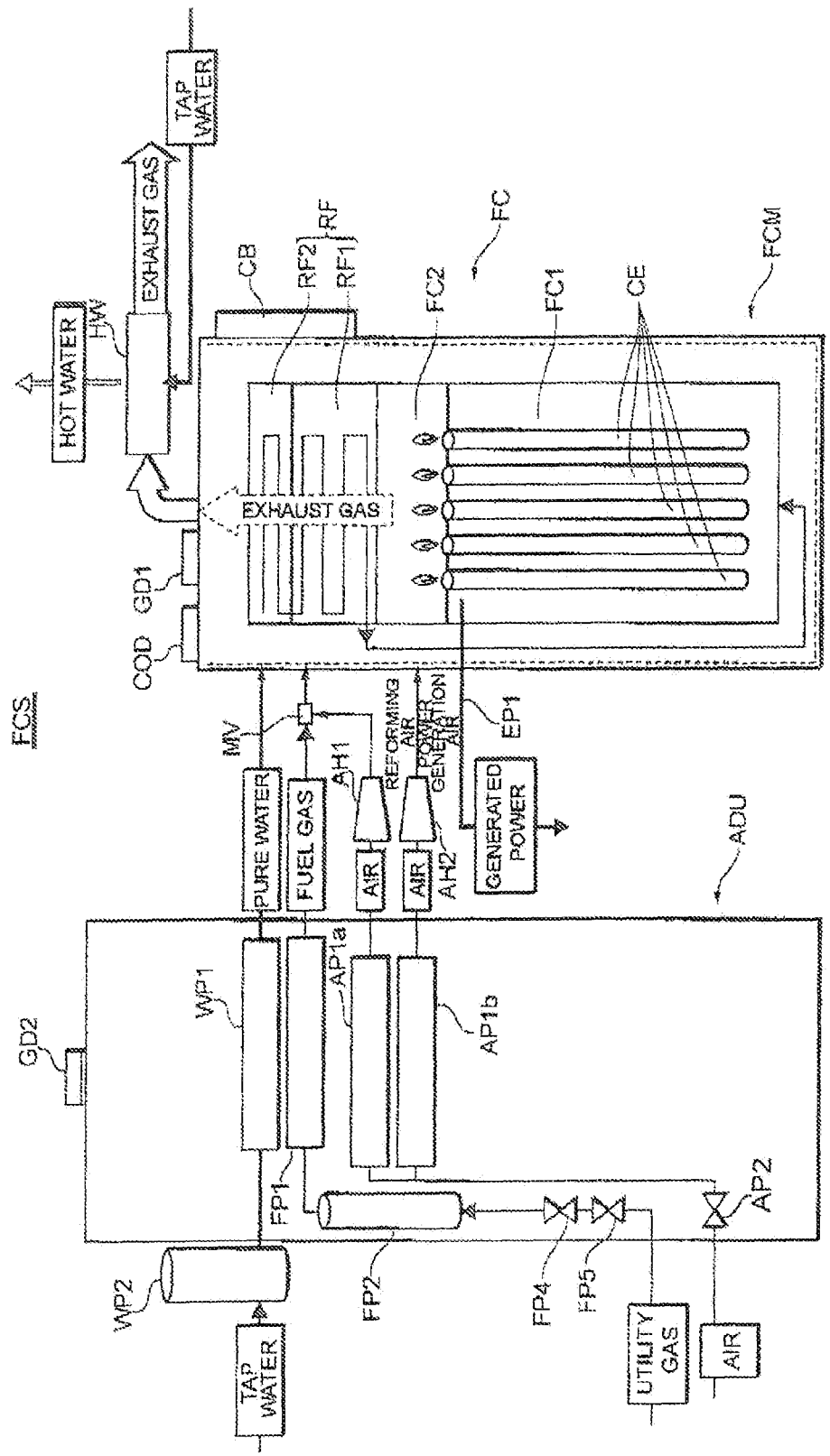
FIG. 1 is a schematic diagram showing the overall configuration of a fuel cell system according to an embodiment of the preset invention.

An embodiment of the present invention is explained below with reference to the accompanying drawings. To facilitate understanding of the explanation, in the drawings, same reference numerals and signs are affixed to same components as much as possible and redundant explanation is omitted.

A fuel cell system according to an embodiment of the present invention is explained with reference to FIG. 1. FIG. 1 is a schematic diagram showing the overall configuration of a fuel cell system FCS according to this embodiment. As shown in FIG. 1, the fuel cell system FCS includes a fuel cell module FCM, an auxiliary device unit ADU, a water storage tank WP2, and a hot water producing device HW.

First, the fuel cell module FCM is explained. The fuel cell module FCM includes a fuel cell FC, a reformer RF, a control box CB, a carbon monoxide detector COD, and a combustible gas detector GD1. The fuel cell FC is a solid-oxide fuel cell and includes a power generation chamber FC1 and a combustion chamber FC2. Plural single cells CE are arranged in the power generation chamber FC1. In the single cell CE, a fuel pole and an air pole are provided across an electrolyte. The single cell CE is configured to be capable of causing a power generation reaction by letting a fuel gas through the fuel pole side and letting the air as an oxidizer gas through the air pole side.

The fuel cell FC in this embodiment is a solid-oxide fuel cell. As a material forming the electrolyte, an oxygen ion conductive oxide is used such as zirconium doped with at least one kind selected out of rare earth elements such as Y and Sc, cerium doped with at least one kind selected out of the rare earth elements, or lanthanum gallate doped with at least one kind selected out of Sr and Mg.

As the material forming the fuel pole, a material is used such as a mixture of Ni and zirconium doped with at least one kind selected out of rare earth elements such as Ca, Y, and Sc, a mixture of Ni and cerium doped with at least one kind selected out of the rare earth elements, or a mixture of Ni and lanthanum gallate doped with at lest one kind selected out of Sr, Mg, Co, Fe, and Cu.

As a material forming the air pole, a material is used such as lanthanum manganite doped with at least one kind selected out of Sr and Ca, lanthanum ferrite doped with at least one kind selected out of Sr, Co, Ni, and Cu, lanthanum cobalt doped with at least one kind selected out of Sr, Fe, Ni, and Cu, or silver. However, the materials forming the electrolyte, the fuel pole, and the air pole are not limited to these.

Electricity generated in the power generation chamber FC1 is extracted as generated power by a power extraction line EP1 and used. The combustion chamber FC2 is a section that burns a residual fuel gas of the fuel gas used for the power generation reaction by the plural single cells CE arranged in the power generation chamber FC1. An exhaust gas generated as a result of burning of the fuel gas in the combustion chamber FC2 is supplied to the hot water producing device HW after being subjected to heat exchange with the reformer RF. The exhaust gas supplied to the hot water producing device HW is further subjected to heat exchange discharged to the outside after raising the temperature of tap water to change the tap water to hot water.

The reformer RF is a section that reforms reforming target gas into a fuel gas and supplies the fuel gas to the power generation chamber FC1 of the fuel cell FC. Forms of reforming of the as include partial oxidation reforming (POX), auto thermal reforming, and steam reforming (SR). Those reforming forms are selectively executed according to an operation state (details are explained later). The reformer RF includes a reforming unit RF1 and an evaporating unit RF2.

The evaporating unit RF2 is a section that evaporates pure water supplied from the auxiliary device unit ADU side to change the pure water to steam and supplies the steam to the reforming unit RF1. The reforming unit RF1 is a section that reforms gas using reforming target gas supplied from the auxiliary device unit ADU side, the air, and the steam supplied from the evaporating unit RF2 and changes the gas to a fuel gas. A reforming catalyst is encapsulated in the reforming unit RF1. As the reforming catalyst, a reforming catalyst obtained by applying nickel to the spherical surface of alumina or a reforming catalyst obtained by applying ruthenium to the spherical surface of aluminum is used as appropriate. In the case of this embodiment, these reforming catalysts are spheres.

The control box CB houses a fuel cell system control unit therein and includes an operation device, a display device, and an alert device. The fuel cell system control unit, the operation device, the display device, and alert device are explained later.

The carbon monoxide detector COD is a sensor for detecting whether incomplete combustion of the residual fuel gas occurs in the combustion chamber FC2 of the fuel cell module FCM and carbon monoxide is generated in the fuel cell module FCM. The combustion gas detector GD1 is a sensor for detecting whether the residual combustion gas is left unburned in the combustion chamber FC2 of the fuel cell module FCM and so-called raw gas is generated in the fuel cell module FCM.

Subsequently, the auxiliary device unit ADU is explained. The auxiliary device unit ADU is a unit including an auxiliary device for supplying water, gas to be reformed, and the air to the fuel cell module FCM. The auxiliary device unit ADU includes (1) a flow rate adjusting unit AP1 including an air blower as an air supplying unit and a flow rate adjusting valve and an electromagnetic valve AP2, (2) a flow rate adjusting unit FP1 including a fuel pump as a fuel supplying unit and a flow rate adjusting valve, a desulfurizer FP2, a gas shut-off valve FP4, and a gas shut-off valve FP5, (3) a flow rate adjusting unit WP1 including a water pump as a water supplying unit and a flow rate adjusting valve, and (4) a combustible gas detector GD2.

The air supplied from an air supply source on the outside is not supplied to flow rate adjusting units AP1$a$ and AP1$b$ if the electromagnetic valve AP2 is closed. The air is supplied to the flow rate adjusting units AP1$a$ and AP1$b$ if the electromagnetic valve AP2 is open. The air subjected to flow rate adjustment by the flow rate adjusting unit AP1$a$ is heated by a heater AH1 as the air for reforming and supplied to a mixing section MV for mixing with a reforming target gas. The air subjected to flow rate adjustment by the flow rate adjusting unit AP1$b$ is heated by the heater AH2 as the air for power generation and supplied to the power generation chamber FC1 of the fuel cell, module FCM. The air of power generation supplied to the power generation chamber FC1 is supplied to the air pole of the single cell CE.

Inflow of a hydrocarbon gas supplied from a fuel supply source on the outside is controlled by the gas shut-off valve FP4, and the gas shut-off valve FP5 that are dual electromagnetic values. When both the gas shut-off valves FP4 and FP5 are open, the hydrocarbon gas is supplied to the desulfurizer FP2. When one of the gas shut-off valves FP4 and FP5 is closed, the hydrocarbon gas is shut off. The hydrocarbon gas supplied to the desulfurizer FP2 changes to a reforming target gas with a sulfur component removed therefrom and is supplied to the flow rate adjusting unit FP1. The reforming gas subjected to flow rate adjustment by the flow rate adjusting unit FP1 is supplied to the mixing unit MV for mixing with the reforming air. The reforming gas and the reforming air mixed in the mixing unit MV are supplied to the reformer RF of the fuel cell module FCM.

Tap water supplied from a water supply source on the outside is changed to pure water and stored in the water storage tank WP2. The pure water stored in the water storage tank WP2 is subjected to flow rate adjustment by the flow rate adjusting unit WP1 and supplied to the reformer RF of the fuel cell module FCM.

The combustible gas detector GD2 is a sensor for detecting whether gas leak occurs in the gas shut-off valve FP5, the gas shut-off valve FP4, the desulfurizer FP2, and the flow rate adjusting unit FP1, which form a system as a fuel supplying unit, and so-called raw gas is discharged to the outside.

Figure 2:
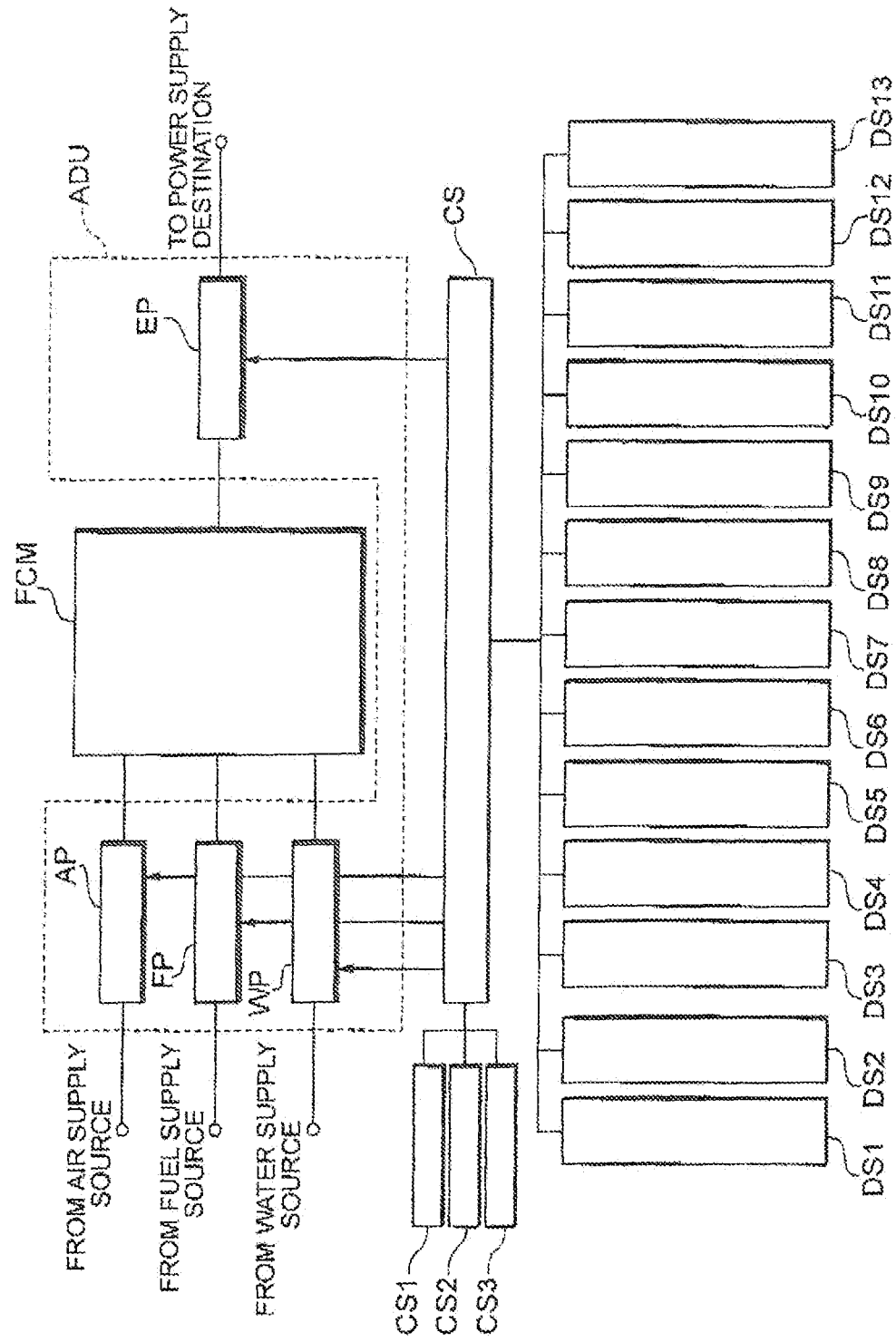
FIG. 2 is a block diagram showing the configuration in terms of control of the fuel cell system shown in FIG. 1.

Subsequently, a configuration in terms of control of the fuel cell system FCS according to this embodiment is explained with reference to FIG. 2. FIG. 2 is a block diagram showing the configuration in terms of control of the fuel cell system FCS. As shown in FIG. 2, the fuel cell system FCS includes the fuel cell module FCM, an air supplying unit AP that supplies the air to the fuel cell module FCM, a fuel supplying unit FP that supplies a gas to be reformed, which changes to a fuel gas, to the fuel cell module FCM, a water supplying unit. WP that supplies water to the fuel cell module FCM, and a power extracting unit EP that extracts electric power from the fuel cell module FCM. The air supplying unit AP, the fuel supplying unit FP, the water supplying unit WP, and the power extracting unit EP are housed in the auxiliary device unit ADU.

The fuel cell module FCM, the air supplying unit AP, the fuel supplying unit FP, the water supplying unit WP, and the power extracting unit EP are controlled on the basis of a control signal output from the system control unit CS. A fuel cell system control unit CS includes a CPU, memories such as a ROM and a RAM, and an interface for exchanging a control signal and a sensor signal. An operation device CS1, a display device C52, and an alert device CS3 are attached to the fuel cell system control unit CS.

An operation instruction signal input from the operation device CS1 is output to the system control unit CS. The system control unit CS controls the fuel cell module FCM and the like on the basis of the operation instruction signal. Information controlled by the system control unit CS and predetermined warning information are output to the display device CS2 and the alert device CS3. Specific hardware configurations of the operation device CS1, the display device CS2, and the alert device C53 are not specifically limited. Optimum hardware configurations are selected according to required functions.

As an example, as the operation device CS1, hardware such as a keyboard, a mouse, or a touch panel is used. As the display device CS2, display type hardware such as a CRT display or a liquid crystal display is used. As the alert device CS3, hardware such as a speaker or a lamp is used. The system control unit CS is housed in the control box CB. The operation device CS1, the display device CS2, and the alert device CS3 are housed in a not-shown, box and arranged indoors.

Sensor signals are output to the system control unit CS from sensors provided in respective place of the fuel cell system FCS. As the sensors that output signals to the system control unit CS, a reformer temperature sensor DS1, a stack temperature sensor DS2, an exhaust temperature sensor DS3, a reformer pressure sensor DS4, a water level sensor DS5, a water flow rate sensor DS6, a fuel flow rate sensor DS7, a reforming air flow rate sensor DS8, a power generation air flow rate sensor DS9, a power state detecting unit DS10, a hot water storage state detection sensor DS11, a carbon monoxide detection sensor DS12, and a combustible gas detection sensor DS13 are provided.

The reformer temperature sensor DS1 is a sensor for measuring the temperature of the reformer RF. In the case of this embodiment, two reformer temperature sensors DS1 are provided. The stack temperature sensor D32 is a sensor for measuring the temperature of the single cell CE arranged in the power generation chamber FC1. The stack temperature sensor DS2 is arranged near a fuel cell stack including the plural single cells CE.

The exhaust temperature sensor DS3 is a sensor for measuring the temperature of an exhaust gas discharged from the combustion chamber FC2. The exhaust temperature sensor DS3 is arranged in a path leading from the combustion chamber FC2 to the hot water producing device HW through the vicinity of the reformer RF. The reformer pressure sensor DS4 is a sensor for measuring the pressure in the reformer RF. The pressure in the reformer RF is measured by the sensor. However, the sensor may detect the pressure in a section where fuel and water are mixed at a pre-stage of the reformer RF.

The water level sensor DS5 is a sensor for measuring a water level of the water storage tank WP2. In the case of this embodiment, four water level sensors DS5 are provided. The water flow rate sensor DS6 is a sensor for measuring a flow rate of pure water supplied from the auxiliary device unit ADU to the fuel cell module FCM. The fuel flow rate sensor DS7 is a sensor for measuring a flow rate of a gas to be reformed supplied from the auxiliary device unit ADU to the fuel cell module FCM.

The air flow rate sensor DS8 is a sensor for measuring a flow rate of reforming air supplied from the auxiliary device unit ADU to the reformer RF of the fuel cell module FCM. The air flow rate sensor DS9 is a sensor for measuring a flow rate of power generation air supplied from the auxiliary device unit ADU to the fuel cell module FCM.

The power state detecting unit DS10 is an aggregate of sensing means and is a section that detects a state of generated power extracted from the fuel cell module FCM. The hot water storage state detection sensor DS11 is an aggregate of sensing means and is a section that detects a hot water storage state of the hot water producing device HW.

The carbon monoxide detection sensor DS12 is a sensor included in the carbon monoxide detector COD and is a sensor that detects leak of carbon monoxide in the fuel cell module FCM into the housing. The combustible gas detection sensor DS13 is a sensor included in the combustible gas detectors GD1 and GD2 and is a sensor that detects leak of a combustible gas in the fuel cell module FCM and the auxiliary device unit ADU.

Figure 3:
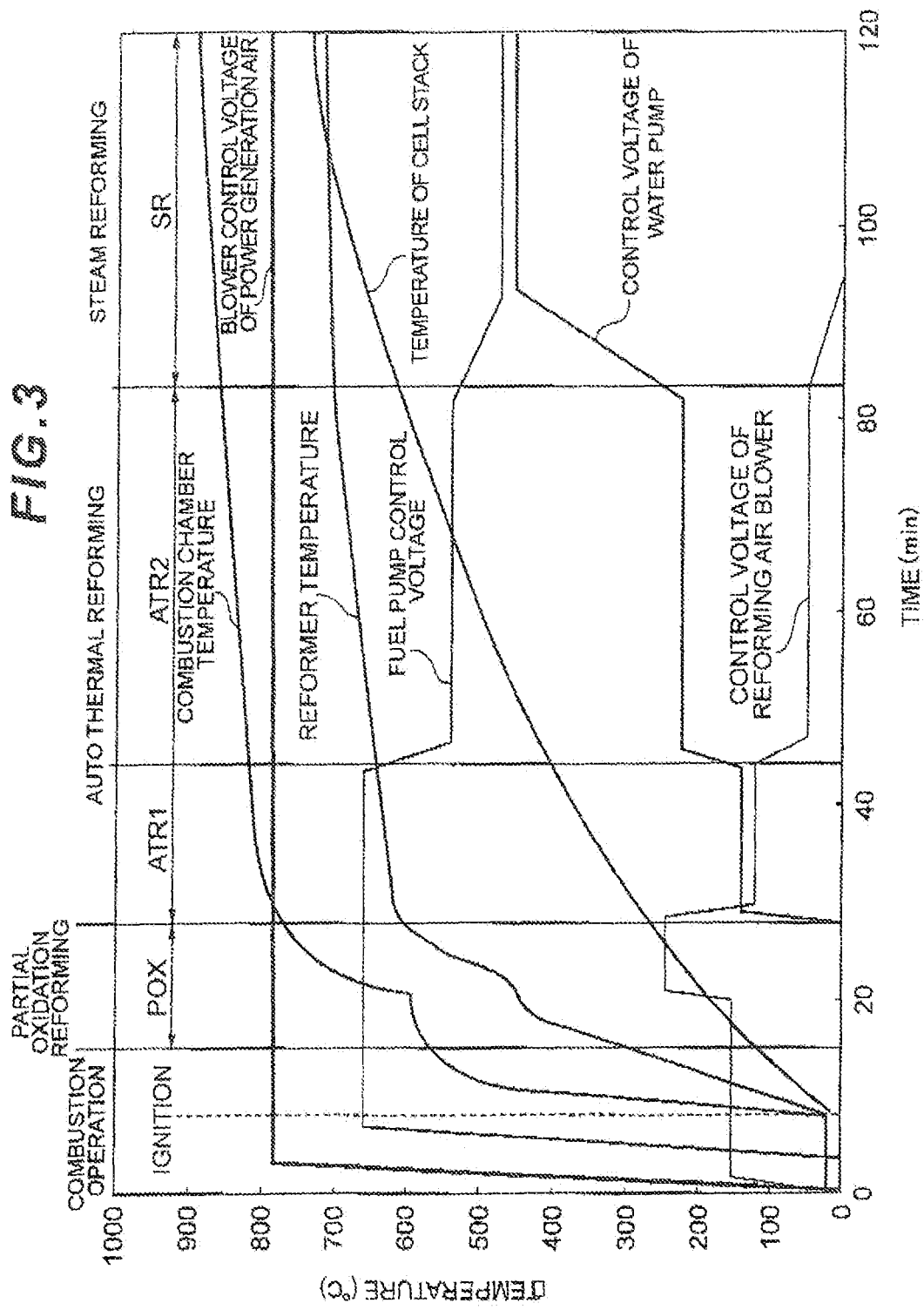
FIG. 3 is a graph showing temperatures of units and control voltages of the units during start of the fuel cell system shown in FIG. 1.

Subsequently, switching of various reforming reactions during start (a start mode) of the fuel cell system FCS is explained with reference to FIG. 3. FIG. 3 is a graph showing temperatures of the units and control voltages of the units during start of the fuel cell system FCS.

In the start mode of the fuel cell system FCS in this embodiment, the fuel cell system FCS advances a reforming reaction while sequentially switching the combustion operation, the partial oxidation reforming POX, the first auto thermal reforming ATR1, the second auto thermal reforming ATR2, and the steam reforming SR. Prior to explaining FIG. 3, the reforming reactions are explained.

The POX is a reforming reaction performed by supplying a gas to be reformed and, the air to the reformer RF. A reaction indicated by Reaction Formula (1) progresses.

$$C_mH_n+xO_2 \rightarrow aCO_2+bCO+cH_2 \quad (1)$$

Since the POX is a heat generating reaction, startability is high. The POX is a reforming reaction suitable in the beginning of start of the fuel cell system FCS. However, in the POX, hydrogen yield is logically low and it is difficult to control the heat generating reaction. The POX is a reforming reaction desirably used only in the beginning of start when heat supply to the fuel cell module FCM is necessary. When attention is paid to only the POX, space velocity is set high. For example, when the reformer RF is dividedly formed and a reformer exclusively used for the POX is provided, the exclusive reformer can be reduced in size.

The SR is a reforming reaction performed by supplying a gas to be reformed and steam to the reformer RF. A reaction indicated by Reaction Formula (2) progresses.

$$C_mH_n+xH_2O \rightarrow aCO_2+bCO+cH_z \quad (2)$$

The SR is a reaction with highest hydrogen yield and high efficiency. However, since the SR is an endothermic reaction, a heat source is necessary. The SR is a reaction suitably used at a state when temperature rises to some degree from the beginning of start of the fuel cell system FCS. When attention is paid to only the SR, since the space velocity is set low, the reformer RF tends to be increased in size.

The ATR including the first ATR1 and the second ATR2 is an intermediate reforming reaction between the POX and the SR. The ATR is a reforming reaction performed by supplying a reforming target gas, the air, and steam to the reformer RF. A reaction indicated by Reaction Formula (3) progresses.

$$C_mH_n+xO_2+yH_2O \rightarrow aCO_2+bCO+cH_2 \quad (3)$$

In the ATR, hydrogen yield is intermediate yield between the hydrogen yield of the POX and the hydrogen yield of the SR and balance of reaction heat can be easily kept. The ATR is a reforming reaction suitable as a reaction for linking the POX and the SR. In the case of this embodiment, a small amount of water is supplied and the first ATR1 closer to the POX is performed first. After temperature rises, water is supplied to be increased and the second ATR2 closer to the SR is performed later.

Referring back to FIG. 3, a start mode of the fuel cell system FCS is explained. In FIG. 3, elapsed time after start is plotted on the abscissa and temperatures of the units are plotted on the left ordinate. Since voltages are control voltages, no specific scale is marked for the voltage. Control voltage for a reforming air blower included in the flow rate adjusting unit AP1a for supplying reforming air, control voltage for a power generation air blower included in the flow rate adjusting unit AP1b for supplying power generation air, control voltage for a fuel pump included in the flow rate adjusting unit FP1 for supplying a reforming target gas, and control voltage for a water pump included in the flow rate adjusting unit WP1 for supplying pure water are shown as rising (a supply amount increases) upward in the figure.

In FIG. 3, the temperature of the reformer RF, stack temperature of the fuel cell stack including the plural single cells CE, the temperature of the combustion chamber FC2 (estimated from, for example, the temperature of the reformer RF), control voltage for the reforming air blower included in the flow rate adjusting unit Ana, control voltage for the power generation air blower included in the flow rate adjusting unit AP1b, control voltage for the fuel pump included in the flow rate adjusting unit FP1, and control voltage for the water pump included in the flow rate adjusting unit WP1 are shown.

First, the flow rate adjusting unit Ana, the electromagnetic valve A22, the heater AH1, and the mixing unit MV are controlled to increase reforming air and the air is supplied to the reformer RF. The flow rate adjusting unit FP1, the gas shut-off valves FP4 and FP5, and the mixing unit MV are controlled to increase the supply of a reforming target gas and the gas is supplied to the reformer RF.

In this way, the air and the reforming target gas are supplied and ignited by an igniter to execute combustion operation (depending on a condition, the air and the gas are ignited by natural ignition to execute the combustion operation). In this case, a flow rate of the reforming air supplied to the reformer RF is 10.0 L (liter) per minute. A flow rate of the gas to be reformed supplied to the reformer RF is 6.0 L per minute. Throughout the entire start mode, the flow rate adjusting unit AP1b is controlled to set a flow rate of the power generation air supplied to the power generation chamber FC1 to 100.0 L per minute. In the combustion chamber FC2 above the power generation chamber FC1, the fuel gas and the power generation air, which have passed the reformer RF, are mixed and burned. The temperature of the combustion chamber FC2 gradually rises.

Subsequently, when the temperature of the reformer RF rises to about 300° C., the reformer RF changes to a state in which POX operation can be performed. When the temperature rises, to about 300° C., the POX advances accordingly. Since the POX is a heat generating reaction, the temperatures of the units rise. When a predetermined time elapses after the POX is started, a supply amount of the reforming air is further increased to further advance the POX. Specifically, a flow rate of the reforming air supplied to the reformer RF is 18.0 L per minute and a flow rate of the reforming target gas supplied to the reformer RF is 5.0 L per minute.

Subsequently, on condition that the temperature of the reformer RF rises to be equal to or higher than about 600° C. and the temperature of the cell stack including the single cells CE exceeds about 250° C., the reforming reaction is shifted to the first ATR1. In the first ATR1, the flow rate of the reforming air supplied to the reformer RF is reduced to 8.0 L per minute and the flow rate of the reforming target gas supplied to the reformer RF is maintained at 5.0 L per minute. Further, an extremely small amount of pure water of 1.0 ml per minute is supplied to the reformer RF.

The ATR is a reaction in which the POX and the SR are mixed. Since internal balance can be thermally kept. Therefore, the reaction advances thermally independently in the reformer RF. The first ATR1 is a reaction close to the POX because an amount of the air is relatively large and is a reaction in which heat generation is dominant. In the first ATR1, the temperature of the cell stack including the single cells CE is about 250° C. to about 400° C.

Subsequently, on condition that the temperature of the reformer RF rises to be equal to or higher than 600° C. and the temperature of the cell stack including the single cells CE exceeds about 400° C., the reforming reaction is shifted to the second ATR2. In the second ATR2, the flow rate of the reforming air supplied to the reformer RF is reduced to 4.0 L per minute and the flow rate of the reforming target gas supplied to the reformer RF is also reduced to 4.0 L per minute. Further, a small amount of pure water of 3.0 ml per minute is supplied to the reformer RF.

The second ATR2 is a reaction close to the SR because an amount of the air is relatively small and an amount of water is large and is a reaction in which heat absorption is dominant. However, since cell stack temperature indicating the temperature in the power generation chamber FC1 exceeds about 400° C., a large temperature fall is not caused even if an endothermic reaction is dominant. In the second ATR, the temperature of the evaporating unit RF2 is equal to or higher than about 100° C.

Subsequently, on condition that the temperature of the reformer RF rises to be equal to or higher than 650° C. and the temperature of the cell stack including the single cells CE exceeds about 600° C., the reforming reaction is shifted to the SR. In the SR, the reforming air supplied to the reformer RF is shut off and the flow rate of the reforming target gas supplied to reformer RF is reduced to 3.0 L per minute. Further, pure water of 8.0 ml per minute is supplied to the reformer RF.

Since the SR is an endothermic reaction, the reaction advances while keeping heat balance by combustion heat from the combustion chamber FC2. Since this stage is a final stage of start, the inside of the power generation chamber FC1 is heated to sufficiently high temperature. Therefore, even if the endothermic reaction is mainly performed, a substantial temperature fall is not caused. Even if the SR advances, a combustion reaction continues in the combustion chamber FC2.

As explained above, when a reforming process is switched from the ignition according to the progress of a combustion process, the temperature in the power generation chamber FC1 gradually rises. When the temperature of the power generation chamber FC1 (the temperature of the cell stack) reaches predetermined power generation temperature lower than rated temperature (about 700° C.) for stably actuating the fuel cell module FCM, an electric circuit including the fuel cell module FCM is closed. Consequently, the fuel cell module FCM starts power generation. Electric current flows to the circuit and electric power can be supplied to the outside. According to the power generation of the single cells CE, the single cells CE themselves also generate heat and the temperature of the single cells CE rises. As a result, the temperature reaches rated temperature for actuating the fuel cell module FCM, for example, 700 to 800° C.

Thereafter, in order to maintain the rated temperature, a combustion gas and the air larger in amounts than amounts of a combustion gas consumed by the single cells CE (gas supplied by reforming the reforming target gas with the reformer RF) and the air are supplied to continue the combustion in the combustion chamber FC2. During the power generation, the power generation advances in the SR with high reforming efficiency. Strictly speaking, the SR itself is performed at about 400° C. to 800° C. However, in a combination with the single cells CE, the SR is set such that the reaction advances at about 500° C. to 700° C.

Figure 4:
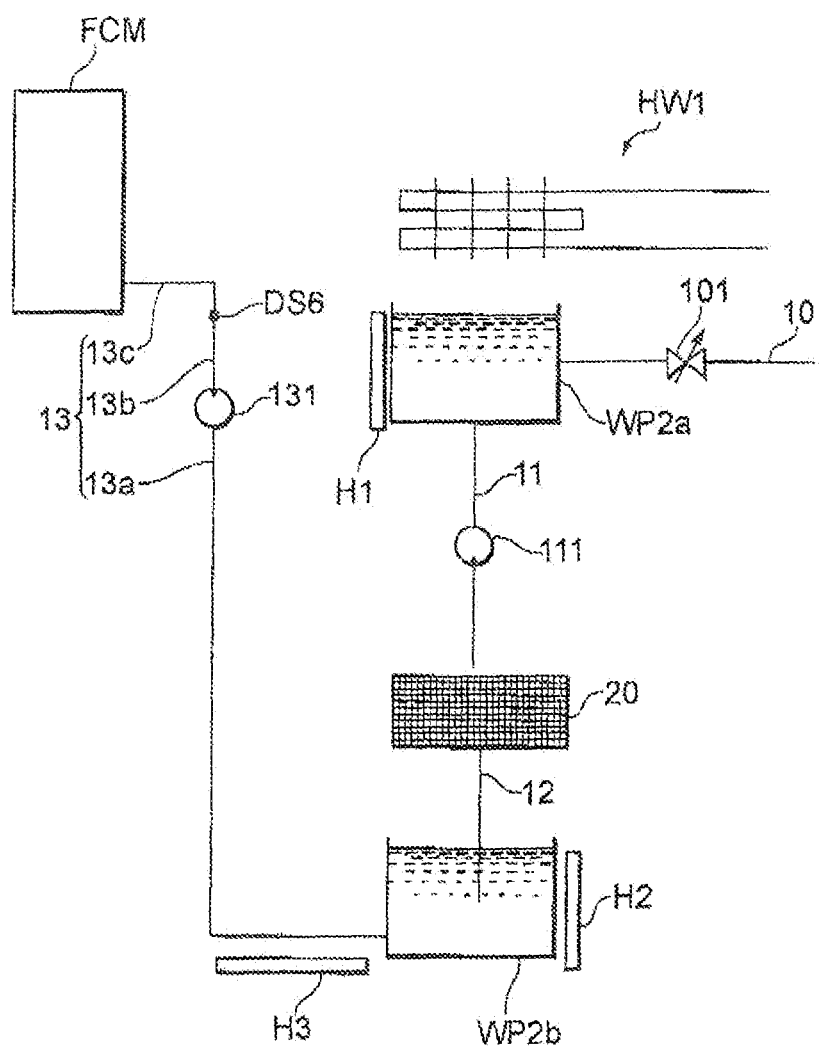
FIG. 4 is a schematic diagram showing the configuration of a section that supplies water to a fuel cell module in the fuel cell system shown in FIG. 1.

In this embodiment, during the start of the first ATR1 shown in FIG. 3, an extremely small amount of water of 1 ml per minute is supplied to the reformer RF. An embodiment for accurately supplying such a small amount of water is explained with reference to FIG. 4. FIG. 4 is a diagram schematically showing a pipe path leading from the water storage tank WP2 to the fuel cell module FCM through the flow rate adjusting unit WP1 shown in FIG. 1.

As shown in FIG. 4, the water storage tank WP2 includes a first tank WP2*a* and a second tank WP2*b*. A water supply pipe 10 to which clean water is supplied is connected to the first tank WP2*a*. An electromagnetic valve 101 is provided in the water supply pipe 10. It is possible to supply the clean water to the first tank WP2*a* and stop the supply of the clean water by opening and closing the electromagnetic valve 101. The first tank WP2*a* is arranged to be capable of receiving water forming dew in a heat exchanger HW1 of the hot water producing device HW. Therefore, it is possible for the first tank WP2*a* to supply water to the water supply pipe 10 when an amount of water is insufficient while storing the water forming dew in the heat exchanger HW1 of the hot water producing device HW. A heater H1 is provided in the first tank WP2*a* to prevent the water in the first tank WP2 from being freezing.

A pump 111 and a reverse osmosis membrane 20 are provided in a conduit 11 that connects the first tank WP2*a* and the second tank WP2*b*. The pump 111 can feed water of 1 L per minute from the first tank WP2*a* to the second tank WP2*b*. Since the water is squeezed into the second water tank WP2*b* side through the reverse osmosis membrane 20 by the pump 111, the water passed through the reverse osmosis membrane 20 changes to pure water and is stored in the second tank WP2*b*. A heater H2 is provided in the second tank WP2*b* to prevent water in the second tank WP2 from freezing.

A pulse pump 131 and the water flow rate sensor DS6 are provided in a conduit 13 that connects the second tank WP2*b* and the fuel cell module FCM. Therefore, the conduit 13 includes a conduit 13*a* from the second tank WP2*b* to the pulse pump 131, a conduit 13*b* from the pulse pump 131 to the water flow rate sensor DS6, and a conduit 13*c* from the water flow rate sensor DS6 to the fuel cell module FCM. A heater H3 is provided near the second tank WP2*b* of the conduit 13*a* to prevent the water in the conduit 13*a*, in particular, water in a position away from the fuel cell module FCM from freezing.

The pulse pump 131 is a pulse pump configured to be capable of feeding water of 1 ml to 10 ml per minute. The water flow rate sensor DS6 is a sensor that can detect a flow of water of 1 ml to 10 ml per minute. As explained with reference to FIG. 3, in this embodiment, the supply of water to the reformer RF is finely controlled. In particular, during the shift to the first ATR1, an extremely small amount of water of 1 ml per minute is fed.

Figure 5:
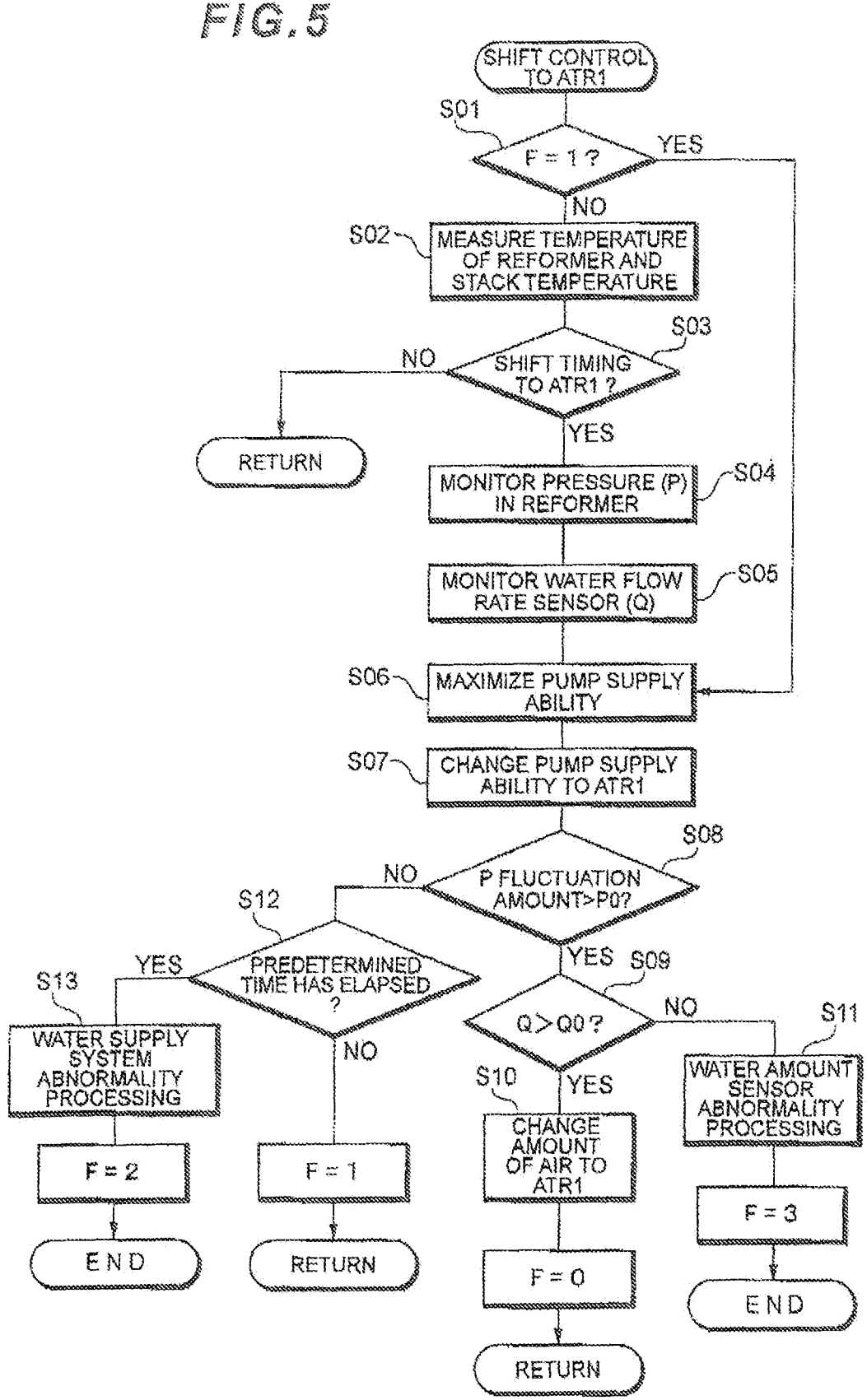
FIG. 5 is a flowchart for explaining control of shift to auto thermal reforming in the fuel cell system shown in FIG. 1.

Control during the shift to the first ATR1 is explained with reference to FIG. 5. FIG. 5 is a flowchart for explaining a method of control during the shift to the first auto thermal reforming ATR1. In the explanation of FIG. 5, a flag F indicates that normal control in the first ATR1 is performed when the flag F is "0", start-operation-control in the first ATR1 is performed when the flag F is "1", abnormality occurs in a water supply system when the flag F is "2", and abnormality occurs in the water flow rate sensor DS6 when the flag F is "3".

In step S01, the system control unit CS determines whether the flag F is "1". When the flag F is "1", the system control unit CS proceeds to processing in step S06. When the flag F is not "1", the system control unit CS proceeds to processing in step S02. In step S02, the system control unit CS measures the temperature of the reformer RF and the temperature of the cell stack including the single cells CE.

In step S03 following step S02, the system control unit CS determines whether the temperature of the reformer RF and the temperature of the cell stack are temperature for shift to the first ATR1. As a result of the determination, the system control unit CS determines whether it is timing for shift to the first ATR1. Specifically, determination criteria are that the temperature of the reformer RF rises to be equal to or higher than about 600° C. and the temperature of the cell stack including the single cells CE exceeds about 250° C. When it is not the timing for shift to the first ATR1, the system control unit CS returns. When it is the timing for shift to the first ATR1, the system control unit CS proceeds to processing in step S04.

In step S04, the system control unit CS starts monitoring of pressure P in the reformer RF using the reformer pressure sensor DS4. In step S05 following step S04, the system control unit CS starts monitoring of a water flow of the conduit 13c using the water flow rate sensor DS6.

In step S06 following step S05, the system control unit CS controls a feeding flow rate of the pulse pump 131 for a predetermined time decided in advance to be maximized (10 ml per minute). Usually, water is supplied into the reformer RF by controlling the feeding flow rate of the pulse pump 131 to be maximized.

In step S07 following Step S06, the system control unit CS controls a supply ability such that the feeding flow rate of the pulse pump 131 reaches a normal flow rate in the first ATR1 after the elapse of the predetermined time. In this embodiment, the feeding flow rate of the pulse pump 131 is maximized. However, the present invention is not limited to this. The feeding flow rate only has to be a high value close to the maximum. For example, no trouble occurs when the feeding flow rate is about 8 ml per minute.

Pressure fluctuation in the reformer RF that occurs when water is started to be supplied into the reformer RF is explained with reference to FIG. 6. FIG. 6 is a timing chart showing a fuel pump control voltage, a reforming air blower control voltage, a power generation air blower control voltage, control voltage of the pulse pump 131, and pressure in the reformer RF from the POX to the SR. In FIG. 6, the fuel pump control voltage, the reforming air blower control voltage, and the power generation air blower control voltage are the same as those shown in FIG. 3.

The control voltage of the pulse pump 131 is controlled to be a maximum value during shift from the POS to the first ATR1 (step S06 explained above). The control for maximizing the control voltage (start-operation-control) is extremely short instantaneous control within a predetermined time (step S07 explained above, a broken line region A in FIG. 6). The control immediately shifts to control for supplying a normal amount of water (1 ml per minute). Water is intermittently fed into the reformer RF at an amount of 1 ml per minute.

The instantaneous time depends on the length of the conduit 13 from the pulse pump 131 to the fuel cell module FCM, in particular, the conduit 13c as explained above. In other words, the instantaneous time depends on how much water in the conduit 13 evaporates. The instantaneous time also depends on a pumping ability that can discharge the air in the pulse pump 131. Therefore, it goes without saying that the instantaneous time may be several seconds or several tens second. In the verification by the inventors, in some case, it was desirable to perform the start-operation-control for about 80 seconds when the instantaneous time was long.

As shown in FIG. 4, at least the conduit 13b and the conduit 13c are interposed between the pulse pump 131 and the fuel cell module FCM. Therefore, even if a supply amount of water of the pulse pump 131 is instantaneously increased to the maximum amount of water, an amount of water equivalent to 10 ml per minute does not reach the fuel cell module FCM. Since the water in the conduit 13c evaporates and disappears, the air is only supplied in most cases. Therefore, it is aimed to perform control, by adjusting maximum supply time of the pulse pump 131, such that an amount of water slightly larger than 1 ml per minute actually reaches the fuel cell module FCM.

Consequently, a temperature fall in the reformer RF due to excess supply of water is prevented not to hinder shift to the ATR. Since the conduit 13c is interposed between the water flow rate sensor DS6 to the fuel cell module FCM, the number of pulses supplied per unit time to the water flow rate sensor DS6 increases. A large amount of the air and a large amount of water flows act and the force of the air and the water also increase. Therefore, it is possible to release the lock of the water flow rate sensor DS6 and set the water flow rate sensor DS6 in the operation state. On the other hand, the water gaining force because of the presence of the conduit 13c is prevented from reaching the reformer RF.

As explained above, this embodiment makes use of predetermined lengths of the conduits 13b and 13c leading from the pulse pump 131 to the fuel cell module FCM and the conduit 13c leading from the water flow rate sensor D56 to the fuel cell module FCM. A supply water amount of the pulse pump 131 is controlled to instantaneously reach the maximum amount of water. The lock or the like of the water flow rate sensor DS6 is released and the water flow rate sensor DS6 is shifted to a sure operation state according to a strong water flow. At the same time, excessive water is prevented from being supplied to the reformer RF.

Further, as shown in FIG. 6, attention is paid to the pressure in the reformer RF. During the POX, since no water is present in the reformer RF and the POX is performed, the pressure is rather high. According to the start of the first ATR1, when water is fed into the reformer RF by the pulse pump 131, as shown in a broken line region in FIG. 6, the pressure in the reformer RF falls and fluctuates at a short period.

The fall and the fluctuation occur because a small amount of water of 1 ml per minute is intermittently fed by the pulse pump 131. Although the pressure in the reformer RF rises when the small amount of water evaporates, since the amount of water is small, the pressure rise due to the evaporation immediately disappears and the pressure falls at the next instance. Since this state is repeated, the pressure fluctuates at a relatively short period.

In other words, with attention paid to the pressure fluctuation in the reformer RF, the present invention takes advantage of a non-ideal state in which water is intermittently fed by the pulse pump 131. According to the fact that pressure P does not fluctuate unless the water is supplied and the pressure P fluctuates when the water is actually supplied into the reformer RF, it is determined whether the water is actually fed into the reformer RF. In the past, it is extremely difficult to determine whether the water is actually fed into the reformer RF. However, the present invention enables the determination. This makes it possible to optimally perform matching of a reduction in an amount of the reforming air and the start of supply of the water without uselessly feeding a large amount of water.

Referring back to FIG. 5, in step S08, the system control unit CS determines whether a fluctuation amount within the predetermined time of the pressure P in the reformer RF exceeds a predetermined amount P0. When the fluctuation amount of the pressure P in the reformer RF exceeds the predetermined amount P0, the system control unit CS proceeds to processing in step S09. When the fluctuation amount of the pressure P in the reformer RF does not exceed the predetermined amount P0, the system control unit CS proceeds to processing in step S12.

In step S09, the system control unit CS determines whether a measured flow rate Q of the water flow rate sensor D56 exceeds a predetermined amount Q0. When the measured flow rate Q of the water flow rate sensor DS6 exceeds the predetermined amount Q0, the system control unit CS determines that the water flow rate sensor DS6 is affected by an act of strong water supply and accurately operates. The system control unit CS proceeds to step S10. When the measured flow rate Q of the water flow rate sensor DS6 does not exceed the predetermined amount Q0, the system control unit CS proceeds to processing in step S11.

In step S21, the system control unit CS executes water supply system abnormal processing assuming that the water flow rate sensor DS6 is abnormal. This is because the water flow rate sensor DS6 does not respond regardless of the assumption that the water flow rate sensor DS6 can be surely set in the operation state because the strong water supply is performed. In step S08, since the fluctuation amount of the pressure P in the reformer RF exceeds the predetermined amount PD, the system control unit CS determines that water is supplied into the reformer RF. On the other hand, in step S09, the system control unit CS determines that the measured flow rate Q of the water flow rate sensor DS6 does not exceed the predetermined amount Q0. It is presumed that some abnormality occurs in the water flow rate sensor DS6. Therefore, the system control unit CS sets the flag F to "3" and ends the processing. As one form, it is conceivable to continue some provisional operation and wait for restoration from the lock of the water flow rate sensor DS6 rather than immediately stop the processing because of the abnormality.

In step S10, the system control unit CS controls an amount of the air fed into the reformer RF to be an amount corresponding to the first ATR1. Since a flow rate of the reforming air blower required for the POX operation is excessive in the first ATR1, the system control unit CS controls to reduce the amount of the air fed into the reformer RF to 8 ml per minute and shifts to the first ATR1.

In step S12, the system control unit CS determines whether a predetermined time has elapsed. Since it is determined in step S08 that the fluctuation amount of the pressure P in the reformer RF is equal to or smaller than the predetermined amount P0, if this state continues for the predetermined time, it is considered that a necessary amount of water is not supplied by the pulse pump 131. Therefore, when the predetermined time has not elapsed in step S12, the system control unit CS proceeds to processing in step S13, sets the flag F to "1" until the predetermined time elapses, and returns. When the predetermined time has elapsed in step S12, the system control unit CS determines that the necessary amount of water is not supplied by the pulse pump 131. In step S13, the system control unit CS determines that some abnormality occurs in the water supply path including the pulse pump 131, sets the flag F to "2", and ends the processing.

What is claimed is:

1. A fuel cell system comprising:
   a fuel cell module having a solid-oxide fuel cell and a reformer configured to perform steam reforming of a fuel gas supplied to the solid-oxide fuel cell;
   a water supplying unit having a water storage tank storing water to be supplied to the reformer, a pump to pump the water stored in the water storage tank to the reformer, and a flow rate detecting unit to detect an amount of the water supplied to the reformer by the pump;
   a control unit is programmed to control the water supplying unit, at least during start up of the fuel cell system, in switching the pump from a stop state to a pumping state to start pumping the water, the control unit is further adapted to shift to a normal control state after performing a start-operation-control to set a feeding flow rate of the pump to a rate higher than the feeding flow rate during the_normal control state for a predetermined time,
   the control unit is further programmed to execute the start-operation-control for setting a feeding flow rate of the pump higher than the feeding flow rate during a normal control state for a predetermined time during a start of auto thermal reforming.

2. The fuel cell system according to claim 1, wherein the auto thermal reforming includes first auto thermal reforming in which the amount of water supplied to the reformer is a first amount, and second auto thermal reforming that is a reaction performed following the first auto thermal reforming when the temperature of the reformer rises to be equal to or higher than predetermined temperature and in which the amount of water supplied to the reformer is a second amount larger than the first amount, and
   the control unit executes the start-operation-control during the start of the first auto thermal reforming.

3. The fuel cell system according to claim 2, wherein, during execution of the start-operation-control, the control unit shifts to the normal control state after determining, on the basis of a detection result of the flow rate detecting unit, that water is pumped from the pump to the reformer.

4. The fuel cell system according to claim 3, wherein the control unit suppresses feeding flow rate of the pump after determining the pumping of water from the pump to the reformer, reduces an amount of air supplied to the reformer, and shifts to the normal control state.

5. The fuel cell system according to claim 1, wherein the start-operation-control for setting a feed flow rate of the pump higher than the feeding flow rate during normal control state for a predetermined time is control for maximizing the feeding flow rate of the pump.

6. The fuel cell system according to claim 1, wherein the pump is arranged above the water storage tank and near a side of the solid oxide fuel cell module including the fuel cell.

7. A fuel cell system comprising:

a fuel cell module having a solid-oxide fuel cell and a reformer configured to perform steam reforming of a fuel gas supplied to the fuel cell;

water supplying unit configured to supply water to the reformer; and control unit programmed to control the water supplying unit, wherein the water supplying unit includes:

a water storage tank to store water supplied to the reformer;

a pump to pump the water stored in the water storage tank to the reformer; and flow rate detecting unit configured to detect a supply amount of the water to the reformer by the pump, and at least during start up of the fuel cell system, in switching the pump from a stop state to a pumping state to start pumping of the water, the control unit is programmed to shift to normal control after performing start-operation-control for setting a feeding flow rate of the pump higher than the feeding flow rate during normal control for a predetermined time, the control unit is further programmed to execute the start-operation-control to set a feeding flow rate of the pump higher than the feeding flow rate during normal control for a predetermined time during a start of the auto thermal reforming.

8. A fuel cell system comprising:

a fuel cell module having a solid-oxide fuel cell and a reformer that performs steam reforming of a fuel gas supplied to the fuel cell;

a water supplying unit having a water storage tank that stores water to be supplied to the reformer, a pump that pumps the water stored in the water storage tank to the reformer, and a flow rate detecting unit that detects a supply amount of the water to the reformer by the pump;

a control unit programmed to control the water supplying unit and, at least during start up of the fuel cell system, in switching the pump from a stop state to a pumping state to start pumping the water, the control unit shifts to normal control after performing a start-operation-control setting a feeding flow rate of the pump higher than the feeding flow rate during normal control for a predetermined time, wherein the control unit starts, during start up, the reforming reaction in the reformer from partial oxidation reforming and transitions the reforming reaction to auto thermal reforming and then to steam reforming, and the control unit executes the start-operation-control during the start of the auto thermal reforming.

* * * * *